US007181769B1

(12) United States Patent
Keanini et al.

(10) Patent No.: US 7,181,769 B1
(45) Date of Patent: Feb. 20, 2007

(54) NETWORK SECURITY SYSTEM HAVING A DEVICE PROFILER COMMUNICATIVELY COUPLED TO A TRAFFIC MONITOR

(75) Inventors: Timothy D. Keanini, Novato, CA (US); Martin A. Quiroga, San Francisco, CA (US); Brian W. Buchanan, San Leandro, CA (US); John S. Flowers, Mission, KS (US)

(73) Assignee: nCircle Network Security, Inc., San Francisco, CA (US)

( * ) Notice: Subject to any disclaimer, the term of this patent is extended or adjusted under 35 U.S.C. 154(b) by 103 days.

(21) Appl. No.: 10/456,837

(22) Filed: Jun. 6, 2003

Related U.S. Application Data

(63) Continuation-in-part of application No. 09/757,963, filed on Jan. 10, 2001, now Pat. No. 6,957,348, and a continuation-in-part of application No. 09/757,872, filed on Jan. 10, 2001, and a continuation-in-part of application No. 09/648,211, filed on Aug. 25, 2000, now Pat. No. 7,073,198.

(60) Provisional application No. 60/388,078, filed on Jun. 11, 2002.

(51) Int. Cl.
*G06F 12/14* (2006.01)
*H04L 9/00* (2006.01)
(52) U.S. Cl. .................. 726/23; 726/25; 713/166
(58) Field of Classification Search .......... 713/200, 713/201
See application file for complete search history.

(56) References Cited

U.S. PATENT DOCUMENTS 5,136,523 A  8/1992  Landers
5,278,901 A  1/1994  Shieh et al.
5,388,211 A  2/1995  Hornbuckle
5,440,723 A  8/1995  Arnold et al.

(Continued)

FOREIGN PATENT DOCUMENTS

EP   1160646 A2 * 12/2001

(Continued)

OTHER PUBLICATIONS

Anonymous, Microsoft Computer Dictionary, 2002, Microsoft Press, Fifth Edition, p. 291.*
Yurcik, William, Controlling Intrusion Detection Systems by Generating False Positives: Squealing Proof-of-Concept, 2002, IEEE, pp. 134-135.*

(Continued)

*Primary Examiner*—Ayaz Sheikh
*Assistant Examiner*—Aravind K Moorthy
(74) *Attorney, Agent, or Firm*—Fenwick & West LLP

(57) ABSTRACT

A system and method for providing distributed security of a network. Several device profilers are placed at different locations of a network to assess vulnerabilities from different perspectives. The device profiler identifies the hosts on the network, and characteristics such as operating system and applications running on the hosts. The device profiler traverses a vulnerability tree having nodes representative of characteristics of the hosts, each node having an associated set of potential vulnerabilities. Verification rules can verify the potential vulnerabilities. A centralized correlation server, at a centrally accessible location in the network, stores the determined vulnerabilities of the network and associates the determined vulnerabilities with attach signatures. Traffic monitors access the attack signatures and monitor network traffic for attacks against the determined vulnerabilities.

18 Claims, 9 Drawing Sheets

U.S. PATENT DOCUMENTS

| | | | |
|---|---|---|---|
| 5,557,742 A | 9/1996 | Smaha et al. | |
| 5,699,403 A | 12/1997 | Ronnen | |
| 5,796,942 A | 8/1998 | Esbensen | |
| 5,798,706 A | 8/1998 | Kraemer et al. | |
| 5,802,320 A | 9/1998 | Baehr et al. | |
| 5,850,516 A * | 12/1998 | Schneier | 713/200 |
| 5,892,903 A | 4/1999 | Klaus | |
| 5,919,257 A | 7/1999 | Trostle | |
| 5,923,646 A | 7/1999 | Mandhyan | |
| 5,925,126 A | 7/1999 | Hsieh | |
| 5,931,946 A | 8/1999 | Terada et al. | |
| 5,958,015 A | 9/1999 | Dascalu | |
| 5,961,644 A | 10/1999 | Kurtzberg et al. | |
| 5,987,611 A | 11/1999 | Freund | |
| 5,991,881 A | 11/1999 | Conklin et al. | |
| 6,006,328 A | 12/1999 | Drake | |
| 6,044,402 A | 3/2000 | Jacobson et al. | |
| 6,088,804 A | 7/2000 | Hill et al. | |
| 6,101,606 A | 8/2000 | Diersch et al. | |
| 6,185,689 B1 | 2/2001 | Todd, Sr. et al. | |
| 6,199,181 B1 | 3/2001 | Rechef et al. | |
| 6,263,444 B1 | 7/2001 | Fujita | |
| 6,269,447 B1 | 7/2001 | Maloney et al. | |
| 6,279,113 B1 | 8/2001 | Vaidya | |
| 6,282,546 B1 | 8/2001 | Gleichauf et al. | |
| 6,298,445 B1 | 10/2001 | Shostack et al. | |
| 6,301,668 B1 | 10/2001 | Gleichauf et al. | |
| 6,321,338 B1 | 11/2001 | Porras et al. | |
| 6,324,656 B1 | 11/2001 | Gleichauf et al. | |
| 6,330,562 B1 | 12/2001 | Boden et al. | |
| 6,343,362 B1 | 1/2002 | Ptacek et al. | |
| 6,347,376 B1 | 2/2002 | Attwood et al. | |
| 6,359,557 B2 | 3/2002 | Bilder | |
| 6,363,489 B1 | 3/2002 | Comay et al. | |
| 6,370,648 B1 | 4/2002 | Diep | |
| 6,408,391 B1 | 6/2002 | Huff et al. | |
| 6,415,321 B1 | 7/2002 | Gleichauf et al. | |
| 6,470,384 B1 | 10/2002 | O'Brien et al. | |
| 6,473,800 B1 | 10/2002 | Jerger et al. | |
| 6,477,651 B1 | 11/2002 | Teal | |
| 6,484,203 B1 * | 11/2002 | Porras et al. | 709/224 |
| 6,484,315 B1 | 11/2002 | Ziese | |
| 6,490,626 B1 | 12/2002 | Edwards et al. | |
| 6,502,135 B1 * | 12/2002 | Munger et al. | 709/225 |
| 6,574,737 B1 * | 6/2003 | Kingsford et al. | 713/201 |
| 6,578,147 B1 * | 6/2003 | Shanklin et al. | 713/200 |
| 6,584,569 B2 | 6/2003 | Reshef et al. | |
| 6,609,205 B1 * | 8/2003 | Bernhard et al. | 713/201 |
| 6,611,869 B1 * | 8/2003 | Eschelbeck et al. | 709/228 |
| 6,687,833 B1 * | 2/2004 | Osborne et al. | 713/201 |
| 6,704,873 B1 * | 3/2004 | Underwood | 713/201 |
| 6,708,212 B2 | 3/2004 | Porras et al. | |
| 6,711,127 B1 | 3/2004 | Gorman et al. | |
| 6,718,535 B1 * | 4/2004 | Underwood | 717/101 |
| 6,735,169 B1 | 5/2004 | Albert et al. | |
| 6,735,702 B1 * | 5/2004 | Yavatkar et al. | 713/201 |
| 6,771,597 B2 | 8/2004 | Makansi et al. | |
| 6,775,657 B1 | 8/2004 | Baker | |
| 6,778,524 B1 * | 8/2004 | Augart | 370/351 |
| 6,789,216 B2 | 9/2004 | Zagorski et al. | |
| 6,816,973 B1 * | 11/2004 | Gleichauf et al. | 713/201 |
| 6,826,172 B1 * | 11/2004 | Augart | 370/351 |
| 6,889,168 B2 * | 5/2005 | Hartley et al. | 702/186 |
| 6,952,779 B1 * | 10/2005 | Cohen et al. | 726/22 |
| 6,990,591 B1 | 1/2006 | Pearson | |
| 2002/0133721 A1 | 9/2002 | Adjaoute | |
| 2004/0015719 A1 * | 1/2004 | Lee et al. | 713/201 |
| 2004/0044912 A1 | 3/2004 | Connary et al. | |
| 2005/0204404 A1 * | 9/2005 | Hrabik et al. | 726/22 |
| 2006/0010389 A1 * | 1/2006 | Rooney et al. | 715/736 |
| 2006/0021034 A1 * | 1/2006 | Cook | 726/22 |
| 2006/0021045 A1 * | 1/2006 | Cook | 726/25 |
| 2006/0069671 A1 | 3/2006 | Conley et al. | |
| 2006/0143710 A1 | 6/2006 | Desai et al. | |
| 2006/0195905 A1 * | 8/2006 | Fudge | 726/25 |

FOREIGN PATENT DOCUMENTS

| | | |
|---|---|---|
| WO | WO 01/31420 A2 | 5/2001 |
| WO | WO 01/84270 A2 | 11/2001 |
| WO | WO0184270 A2 * | 11/2001 |
| WO | WO 02/19661 A2 | 3/2002 |
| WO | WO0227443 A2 * | 4/2002 |
| WO | WO 02/45380 A2 | 6/2002 |
| WO | WO 02/061544 A2 | 8/2002 |
| WO | WO 03/084181 A1 | 10/2003 |
| WO | WO 03/100617 A1 | 12/2003 |

OTHER PUBLICATIONS

Skaggs et al, Network Vulnerability Analysis, 2002, IEEE, pp. 493-495.*

Phipatanasuphorn et al, Vulnerability of Sensor Networks to Unauthorized Traversal and Monitoring, 2004, IEEE, pp. 364-369.*

Bace, Rebecca, An Introduction To Intrusion Detection & Assessment, ICSA, Inc., 1999, pp. 1-38.

Fyodor, Remote OS Detection Via TCP/IP Stack FingerPrinting, Oct. 18, 1998, pp. 1-10.

Ristenbatt, Martin P., Methodology For Network Communication Vulnerability Analysis, IEEE, 1988, pp. 493-499.

Skaggs, B., et al., Network Vulnerability Analysis, IEEE, 2002, pp. 493-495.

Thatcher, Michelle, Keeping Your Technology Secure, Technology & Learning, Apr. 2002, pp. 38, 40, 42 and 44.

Abstract, W. Erhard, et al., "Network Traffic Analysis and Security Monitoring with UniMon", Proceeding of the IEEE Conference on High Performance Switching and Routing, 2000, ATM 2000, pp. 439-446 (Jun. 2000).

Abstract, Dept. of Comput. Sci., California Univ., Davis, CA, USA, "A Methodology For Testing Intrusion Detection Systems", IEEE Transactions on Software Engineering, vol. 22, Issue 10, pp. 719-729 (Oct. 1996).

Abstract, Mounji A. Le Charlier, et al., "Distributed Audit Trail Analysis", Proceeding of the Symposium on Network and Distributed System Security, 1995, pp. 102-112 (Feb. 16-17, 1995).

Abstract, L.T. Heberlein, et al., "A Network Security Monitor" Proceeding of the 990 IEEE Computer Society Symposium on Research in Security and Privacy, pp. 296-304, (May 7-9, 1990).

Abstract, Xinzhou Quin et al., "Integrating Intrusion Detection and Network Management", Network Operation and Management Symposium, 2002. NAOMS 2002. 2002 IEEE/IFIP, pp. 329-344 (Apr. 15-19, 2002).

Abstract, D.G. Schwartz et al., "A Case-Based Approach To Network Intrusion Detection", Proceeding of the 5th International Conference on Information Fusion, 2002. vol. 2 pp. 1084-1089 (Jul. 8-11, 2002).

Abstract, "Open Source Security: Opportunity or Oxymoron?" Computer, vol. 35, Issue 3, pp. 18-21 (Mar. 2002).

Abstract, Liu Dihua, et al. "Data Mining For Intrusion Detection", Proceedings ICII 2001—Beijing 2001 International Conference on Info-Tech and Info-Net, 2001, vol. 5, pp. 7-12, (Oct. 29-Nov. 2001).

Abstract, Kai Hwang & M. Gangadharan, "Micro-Firewalls for Dynamic Network Security With Distributed Intrusion Detection", NCA 2001 IEEE International Symposium on Network Computing and Applications, 2001. pp. 68-79, (Oct. 8-10, 2001).

Abstract, Wenke Lee Stolfo, et al., "Real Time Data Mining-Based Intrusion Detection", Proceedings DARPA Information Survivability Conference & Expositon II, 2001, DISCEX '01. vol. 1, pp. 89-100 (Jun. 12-14, 2001).

Abstract, J. Burns, et al., Automatic Management Of Network Security Policy, Proceedings DARPA Information Survivability Conference & Exposition II 2001, DISCEX '01. vol. 2, pp. 12-26, (Jun. 12-14, 2001).

Abstract, Heberlein, et al. "A Network Security Monitor", 1990, Proceedings Research in Security & Privacy 1990 IEEE Computer Society Symposium on, pp. 296-304, (May 7-9, 1990).

"Microsoft Computer Dictionary Fifth Edition," 2002, 6 pages.

Anderson, Teresa, "Hunting for Holes," Security Management, Arlington, Apr. 1996, 2 pages.

Breyfogle, Stacey, "Don't Stop at Your Servers," Software Magazine, Englewood, Jan. 1998, pp. 1-3.

Johnson, Johna Till, "Simulated Attack for Real Network Security," Data Communications, Nov. 2, 1995, pp. 31-32.

Goseva-Popstojanova, K., et al., "Characterzing Intrusion Tolerant Systems Using a State Transition Model," 2001, pp. 211-221, IEEE.

Merideth, M. G., et al., "Elephant Network Intrusion Detection Systems that Don't Forget," Proceedings of the 38$^{th}$ Hawaii International Conference on System Sciences, 2005, pp. 1-10, IEEE.

* cited by examiner

NETWORK SECURITY SYSTEM HAVING A DEVICE PROFILER COMMUNICATIVELY COUPLED TO A TRAFFIC MONITOR

CROSS-REFERENCE TO RELATED APPLICATIONS

This application claims the benefit of U.S. Provisional Application No. 60/388,078, filed on Jun. 11, 2002, which is incorporated herein by reference; and is a continuation-in-part of U.S. patent application Ser. No. 09/757,963 filed on Jan. 10, 2001 now U.S. Pat. No. 6,957,348, Ser. No. 09/757,872 filed on Jan. 10, 2001 and Ser. No. 09/648,211 filed on Aug. 25, 2000 now U.S. Pat. No. 7,073,198, which are also incorporated herein by reference.

BACKGROUND OF THE INVENTION

1. Field of the Invention

This invention pertains in general to a computer network security system and, more specifically, to profiling a network for vulnerabilities and monitoring exploitations of those vulnerabilities.

2. Background Art

Computer networks are vulnerable to many threats that can inflict damage resulting in significant losses. These threats can stem from a number of sources including malicious acts, environmental hazards, hardware and software failure, and user error. A goal of network security is to protect the confidentiality, integrity, and availability of information stored electronically in a network from these threatening sources.

Several conventional resources are available to protect a network from information losses. Firewalls are used to enforce a boundary between two or more networks by filtering network traffic passing through the firewall according to a security policy. Vulnerability detection tools perform examinations of a network to determine weaknesses that might allow attacks. Also, separate intrusion detection tools monitor a network for malicious traffic.

One problem with conventional resources is that firewalls are inadequate to fully protect a network since they traditionally only provide protection against malicious traffic passing through the firewall. The network may still be vulnerable through entry points that do not pass through the firewall.

Furthermore, vulnerability detection tools and intrusion detection tools are inherently complicated to configure and typically lack interoperability. Consequentially, security engineers need to know what types of attack signatures to look for, how to look for them, and how to respond to a detected attack. Vulnerability detection tools inaccurately assess system vulnerabilities due to limited information about the system. Likewise, intrusion detection tools generate many false positives and operate inefficiently by failing to leverage off of the limited information gathered by the vulnerability detection tools.

Therefore, there is a need for network protection that does not suffer from these problems. Preferably, the solution to this need will include vulnerability detection aspects to non-invasively detect vulnerabilities and allow the intrusion detection aspects to leverage off of the vulnerability assessment aspects.

SUMMARY OF INVENTION

The present invention meets these needs by identifying, monitoring, and updating verified vulnerabilities in a network before a malicious attack on the vulnerabilities.

The system of the present invention includes a device profiler, a centralized correlation server, and at least one traffic monitor communicatively coupled through a network. The device profiler determines vulnerabilities of hosts on the network and transmits the vulnerabilities to the centralized correlation server. The centralized correlation server gathers the resulting vulnerabilities and sends attack signatures for exploits of the vulnerabilities to the traffic monitor. The traffic monitor monitors network traffic to detect traffic matching the attack signatures. The system periodically rescans the network in order to ensure that the traffic monitor is monitoring for only current vulnerabilities. Thus, the present invention enables effective monitoring and reduces false positives by monitoring for only exploits of vulnerabilities known to currently exist on the network.

The device profiler includes a control module communicating with an identification subsystem for identifying characteristics of a host such as applications and/or operating systems running on the host. A high-level sensor examines OSI (Open Systems Interconnection) layer 5, layer 6 and/or layer 7 aspects of the host to determine running applications and other characteristics of the host. A low-level sensor examines responses to anomalous data packets sent to the host to determine an operating system and other characteristics of the host. In one embodiment, the low-level sensor examines OSI layer 3 and 4 aspects of the host.

To determine potential vulnerabilities, the control module traverses at least one vulnerability tree having nodes representative of the characteristics of the host, wherein each node has an associated set of potential vulnerabilities. The control module determines a set of potential vulnerabilities by summing the vulnerabilities at each traversed node. The control module determines whether the vulnerabilities actually exist on the host and sends a list of the verified vulnerabilities to the centralized correlation server.

The centralized correlation server, preferably coupled to the network at a centrally accessible location, includes a network profiling module that stores rules for identifying host characteristics and distributes the rules to the device profiler. Additionally, the network profiling module stores the resulting determined vulnerabilities.

The centralized correlation server also includes a network monitoring module that associates the determined vulnerabilities with attack signatures. The network monitoring module is further adapted to send the attack signatures to the traffic monitor according to a monitoring location. In one embodiment, the centralized correlation server receives determined vulnerabilities from a plurality of device profilers and sends attack signatures to a plurality of traffic monitors distributed to locations around the network.

An event daemon module in the centralized correlation server performs actions to block malicious activity in response to detecting potential vulnerabilities or an attack thereon. For example, the event daemon module configures the firewall to prevent or block an attack.

A traffic monitor monitors network traffic for attack signatures corresponding to the determined vulnerabilities to detect malicious activity. In one embodiment, the traffic monitor associates attack signatures with the specific destination (e.g., IP address and/or port) having the corresponding vulnerability. The traffic monitor does not signal an attack unless the attack matches the attack signature of an exploit of a vulnerability and is directed to a destination known to have the vulnerability.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
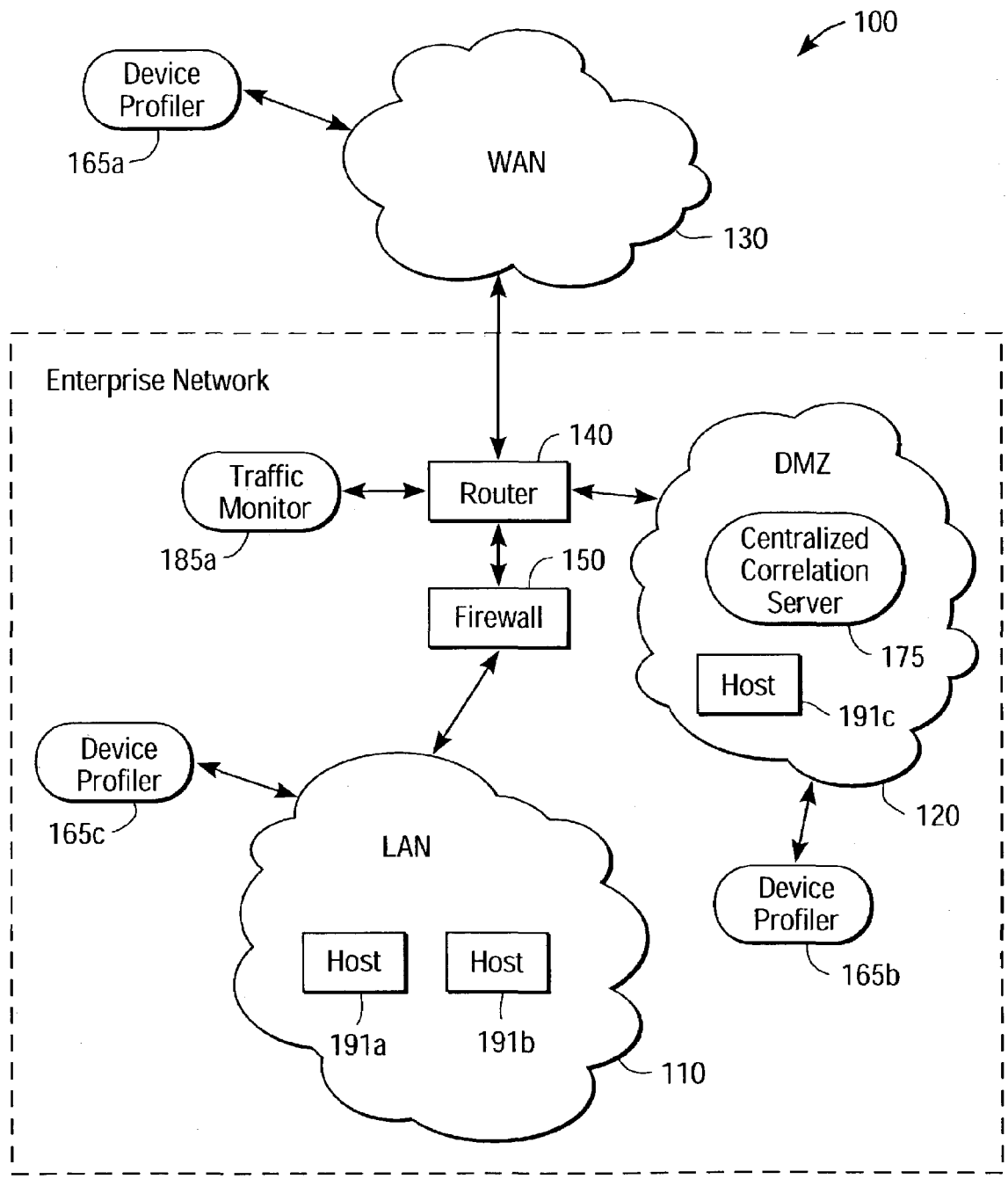
FIG. 1 is a high-level block diagram illustrating a system 100 according to an embodiment of the present invention.

FIG. 1 is a high-level block diagram illustrating a system 100 according to an embodiment of the present invention. The system 100 comprises a WAN (wide area network) 130, such as the Internet, in communication with an enterprise network 115. The WAN 130 facilitates data transfers between geographically dispersed network hosts, such as computers. The connections to the WAN 130 may be wired and/or wireless, packet and/or circuit switched, and use network protocols such as IEEE 802.11, Ethernet, Asynchronous Transfer Mode, or the like. In a packet-based network, a communications protocol, such as TCP/IP (Transmission Control Protocol/Internet Protocol), encapsulates data into packets having headers. A packet's header contains information relating to routing, error-correction and packet identification, among other things. One of ordinary skill in the art will recognize numerous variations of networking encompassed within the present invention that are not specifically disclosed herein.

The enterprise network 115 includes a LAN 110 (Local Access Network) with hosts 191a,b and a DMZ 120 (De-Militarized Zone). In this embodiment, device profilers 165a–c are coupled to the WAN 130, the LAN 110, and the DMZ 120, and a traffic monitor 185a is coupled to the router 140.

The LAN 110 allows hosts 191a,b to communicate with each other and with other hosts on the DMZ 120 and WAN 130 through a firewall 150 and a router 140. The LAN 110 may be implemented as an independent network, or as a subset of a larger network such as the WAN 130. Further embodiments of the LAN 110 are discussed below.

The hosts 191a,b serve as pass through points or endstations for data packets on the WAN 130, LAN 110, or another network. The hosts 191a,b (and other hosts described below) may be a computer, computer peripheral, telephone, or other device able to connect to a network. The hosts have characteristics such as a network address, open ports, and software executing on the host including an operating system and applications. The hosts 191a,b run the operating system and the operating system runs applications, both of which may be of a certain version and patch level. Likewise, both the operating system and the applications are vulnerable to malicious activity. The hosts 191a,b typically have a hard drive or other data storage module holding information or other resources that can be compromised by malicious activity.

Applications executing on the hosts 191a,b may include software programs, firmware code, and the like. Some applications performing network services run on open ports of the host 191a,b. A port is a logical communication path that allows applications on the network to communicate. Individual ports on the hosts 191a,b are identified by a number. Certain applications typically run on certain port numbers. For example, an HTTP (HyperText Transport Protocol) server application typically runs on port 80 of the hosts 191a,b.

The DMZ 120 allows a host 191c to communicate with the hosts 191a,b on the LAN 110 and other hosts 191 on the WAN 130 through the router 140. However, communications with the WAN 130 occur without passing through the firewall 150, which means that hosts on the DMZ can provide services utilizing network traffic that would be blocked by the firewall 150, but are also more susceptible to malicious traffic. The host 191c interacts with the WAN 180 by running applications responsive to requests from WAN hosts 191 such as HTTP, FTP (File Transfer Protocol), DNS (Domain Name System) and/or email servers. Additionally, the host 191c interacts with the LAN 110 by serving as a proxy for network interactions for LAN hosts 191a,b with the WAN 130. As will be recognized by one of ordinary skill in the art, alternative network configurations of the DMZ 120 such as a DMZ 120 placed between the LAN 110 and the firewall 150, and a DMZ 120 placed between the router 140 and the firewall 150, are also encompassed within the present invention.

The router 140 determines network routing paths for data packets traveling between devices connected to the WAN 130 and the enterprise network 115 based on tables of available routes and their conditions. Specifically, the router 140 forwards incoming data packets to addresses on the LAN 110 and the DMZ 120 and forwards outgoing data packets to addresses in the WAN 130. The router 140 may be a conventional network router implemented in hardware or software as an independent module, or in combination with other modules such as the firewall 150 or a switch.

The firewall 150 restricts certain network traffic according to a configured firewall policy to prevent or block malicious attacks on the enterprise network 115 in response to detecting a vulnerability or an attack thereon. Thus, hosts 191a,b behind the firewall 150 may not be accessible from the WAN 130. Under a very restrictive policy, the firewall 150 may effectively isolate the LAN 110 from the WAN 130 by blocking all incoming and outgoing network traffic. Under a less restrictive policy, the firewall 150 may allow outgoing network traffic and corresponding responses from the WAN 130. In network configurations with the DMZ 120 located behind the firewall 150 with respect to the WAN 130, the policy may allow incoming requests to pass through certain ports, for example, port 80 for HTTP requests. The firewall 150 may be a conventional firewall implemented in hardware or software, as an independent module, or in combination with other modules, for example, the router 140 or a host 191.

The device profilers 165a–c collect data about the enterprise network 115 for vulnerability analyses. Preferably, the multiple device profilers 165 are distributed around the enterprise network 115 at locations that offer different perspectives of vulnerabilities. In the illustrated embodiment, the device profilers 165a–c are connected to the WAN 130, the LAN 110 and the DMZ 120 in order to generate a more accurate portrait of network vulnerabilities in comparison to a single point of data collection. Further embodiments of the device profilers 165a–c are discussed below.

A centralized correlation server 175, preferably located in the DMZ 120, maintains centralized control of network security for the enterprise network 115. For example, the centralized correlation server 175 maintains a centralized database of potential vulnerabilities, maintains a centralized database of actual vulnerabilities identified by the device profilers 165a–c, and communicates with both device profilers 165 and traffic monitors 185. Thus, the centralized correlation server 175 is preferably located in the DMZ 130 or at another point in the system 100 where it can communicate with each device profiler 165 and traffic monitor 185. In other embodiments, the centralized correlation server 175 is located in the router 140 or the WAN 130. Further embodiments of the centralized correlation server 175 are discussed below.

The traffic monitor 185a examines network traffic for exploitations of vulnerabilities of the enterprise network 115. One or more traffic monitors 185 are deployed in the system 100, preferably at locations where they can monitor most or all of the network traffic. By communicating with the network security centralized correlation server 175, the traffic monitor 185a accesses vulnerability information particular to its location such as associated attack signatures from the centralized correlation server 175. When an attack is identified, the traffic monitor 185a notifies the centralized correlation server 175, which contains a set of actions to perform in response to the attack. In one embodiment, the traffic monitor 185b is coupled to the WAN 130 side of the router 140. In another embodiment, the traffic monitor 185b is coupled to the LAN 110 side of the router 140. Further embodiments of the traffic monitor 185 are discussed below.

Figure 2:
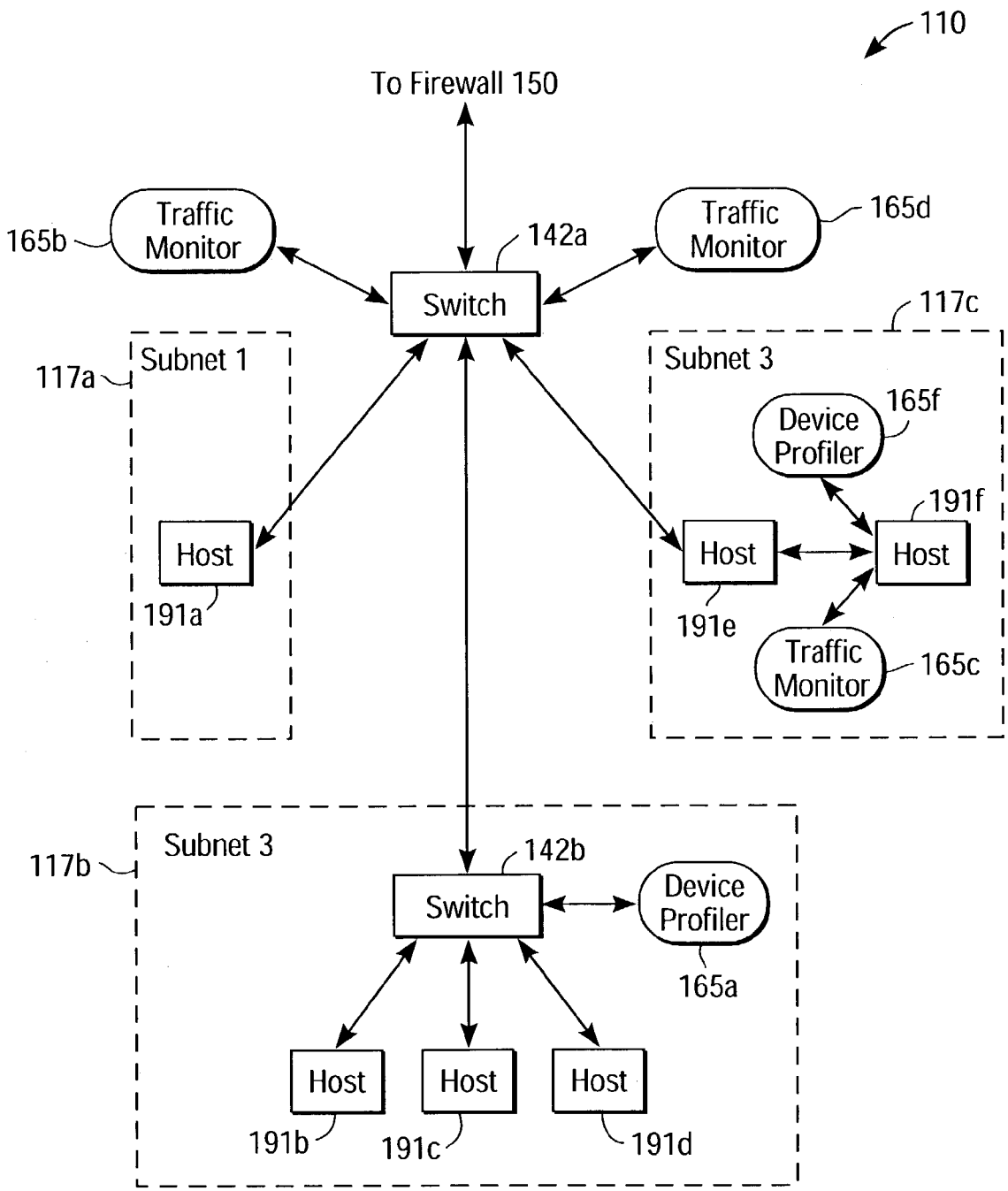
FIG. 2 is a block diagram illustrating a more detailed view of the exemplary LAN 110 of FIG. 1.

FIG. 2 is a block diagram illustrating a more detailed view of the exemplary LAN 110 of FIG. 1. The LAN 110 includes a device profiler 165d, a traffic monitor 185b, a subnet 1 117a, a subnet 2 117b, and a subnet 3 117c, each of which is coupled to a switch 142a.

The switch 142a may be a conventional switch for sending network traffic received from the router 140 to the appropriate subnet 117, and network traffic received from the subnets 117a–c to a different subnet 117 or to the router 142a.

The device profiler 165d is placed at a location that allows it to determine vulnerabilities of the LAN 110 from inside the firewall 150. Because the firewall 150 limits access to hosts 191 inside its purview, the ability to recognize these hosts 191 and their characteristics depends on from which side of the firewall 150 the assessment is made. From its location, the device profiler 165d communicates with the subnets 117a–c without being affected by the access policies of the firewall 150. Thus, the device profiler 165d inside the firewall 150 can identify vulnerabilities that may not be apparent to device profilers 165 located outside of the firewall 150.

The traffic monitor 185b is also placed at a location between the firewall 150 and the switch 142a that allows it to examine network traffic for exploitations of vulnerabilities of the LAN 110. In the illustrated embodiment, the traffic monitor 185b is coupled to the span port of the switch 142a so that it can examine all data packets traveling between the LAN 110 and the WAN 130. In another embodiment permitting examination of the same traffic, the traffic monitor 185b is coupled to a port on the router 140 coupled to the LAN 110. In yet another embodiment, the traffic monitor 185b is coupled to ports on the switch 142a that are coupled to the subnets 117a–c.

In the illustrated embodiment, subnet 1 117a includes a single host 191a. In contrast, subnet 2 117b includes a device profiler 165e and multiple hosts 191b–d coupled to a switch 142a. The device profiler 165e within subnet 2 117b is positioned to detect vulnerabilities on hosts 191b–d within the subnet 117.

Subnet 3 117c includes a device profiler 165f, a traffic monitor 185c, and two hosts networked via a direct connection. The first host 191e is coupled to the switch 142a and the second host 191f is coupled to the first host 191e. The device profiler 165f is placed at a location that allows it to determine vulnerabilities of the host 191f from a location between the hosts 191e, f unaffected by any policies other than the host 191f itself. The traffic monitor 185c is placed at a location that allows it to monitor network traffic from a location between the hosts 191e, f.

Figure 3:
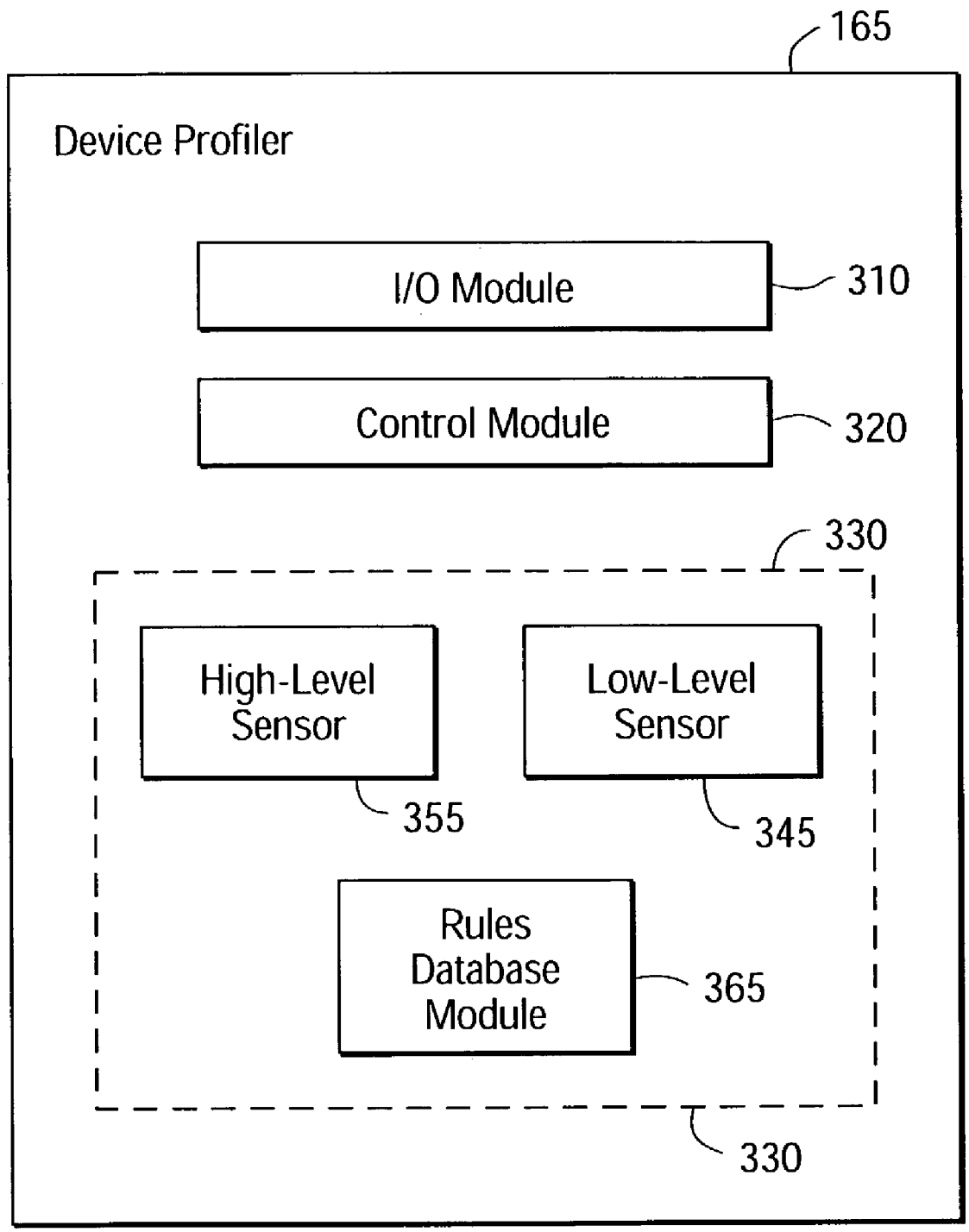
FIG. 3 is a block diagram illustrating a device profiler 165 according to an embodiment of the present invention.

FIG. 3 is a block diagram illustrating a device profiler 165 according to an embodiment of the present invention. The device profiler 165 preferably comprises an I/O module 310, a control module 320, and an identification subsystem 330. The I/O module 310 allows the device profiler 165a to communicate with other devices on the network such as hosts 191, the centralized correlation server 175, and traffic monitors 185. In another embodiment, the I/O module 310 generates data packets to send to hosts 191 according to instructions from the control module 320 and/or identification subsystem 330. Depending on the embodiment, the I/O module 310 may be a network interface card or other hardware, a software module, or a combination of both.

The control module 320 manages the vulnerability identification process and controls the general operation of the device profiler 165. In operation, the control module 320 identifies hosts 191 on the network and characteristics of the hosts 191 and use the characteristics to determine the host's vulnerabilities. In one embodiment, the control module 320 uses ping requests to identify hosts on the network and TCP connection attempts to identify open ports of the hosts. Based on this information, the control module 320 sends messages to the identification subsystem 330 instructing it to carry out various analyses to identify and verify vulnerabilities of hosts 191 on the network. Ultimately, the control module 320 generates and sends a list of these vulnerabilities to the centralized correlation server 175.

The identification subsystem 330 detects vulnerabilities in hosts 191 on the network using identification and verification processes. The identification subsystem 330 includes a low-level sensor 345, an high-level sensor 355, and a rules database module 365. Other embodiments have different and/or additional modules for detecting vulnerabilities than the ones described herein.

The high-level sensor 355 identifies applications and other characteristics of the hosts 191 by analyzing how the hosts 191 interact at the higher layers of the OSI (Open System Interconnection) stack. For example, telnet applications typically run on port 23. Responsive to port 23 being open, the high-level sensor 355 attempts to open a telnet session on the port and sends a command line instruction to which the telnet application identifies itself by name, version and/or patch level. One embodiment of the high-level sensor 355 analyzes layer 5, layer 6 and layer 7 OSI stack interactions. These layers respectively correspond to the session layer, the presentation layer, and the application layer.

The low-level sensor 345 identifies operating systems running on hosts 191 and/or other characteristics by sending anomalous data packets to the hosts and analyzing the lower level OSI stack characteristics of packets received in response. In one embodiment, the low-level sensor analyzes the layer 3 and 4 characteristics. Layer 3 corresponds to the network layer and layer 4 corresponds to the transport layer of the OSI stack. The low-level sensor 345 generates and sends data packets based on a set of rules. The rules and packets are designed to generate a response from a host 191 that provides information about the operating system or other characteristics of the host 191.

In one embodiment, the data packets are anomalous data packets relative to normal data packets that conform to standards. For example, normal packets may adhere to RFC (Request For Comment) protocols promulgated by the Internet Engineering Task Force. The host 191 typically responds to normal data packets with normal responses. By contrast, the host 191 may have unique responses to anomalous data packets deviating from the RFC standard. The response can be compared to operating system fingerprints, or templates of known responses, to identify the operating system, version and/or patch level. In one embodiment, the low-level sensor 345 follows-up one or a set of data packets with another or another set of data packets based on responses to the preceding data packets. Several illustrative responses to probes are set forth in U.S. patent application Ser. No. 09/648,211.

The rules database module 365 holds rules utilized by the control module 320, the low-level sensor 345, and the high-level sensor 355 to identify characteristics of the hosts 191. These rules include control logic for operating the high-355 and low-level 345 sensors to determine the host's characteristics. In one embodiment, the rules database module 365 also stores potential vulnerabilities of hosts in one or more tree-like data structures, referred to as "vulnerability trees" 400 (e.g., an application vulnerability tree and an operating system vulnerability tree). The control module 320 is adapted to fire rules in the rules database module 365 that use the high-355 and/or low-level sensors 345 to determine the host's characteristics and use these characteristics to traverse the vulnerability tree 400 and identify potential vulnerabilities at each host 191. In one embodiment, the rules database module 365 also stores rules to verify the potential vulnerabilities. The rules database module 365 is preferably configured to receive occasional rule updates from the centralized correlation server 175.

Figure 4:
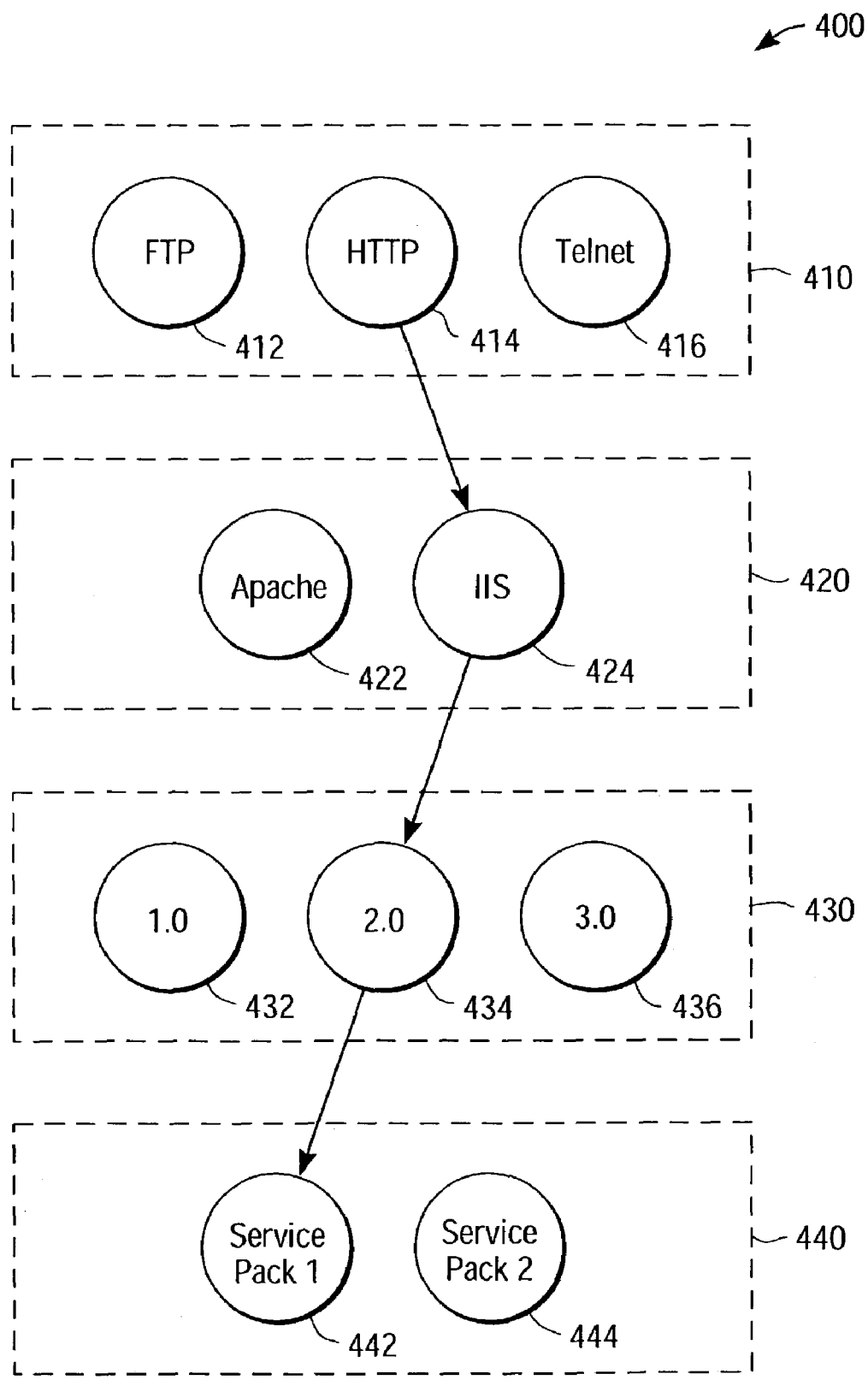
FIG. 4 is a block diagram illustrating an example of a vulnerability tree 400 according to an embodiment of the present invention.

FIG. 4 is a block diagram illustrating an example of a vulnerability tree 400 according to an embodiment of the present invention. In general, a vulnerability tree 400 has multiple nodes arranged in a tree structure, such that there is a root node and multiple child nodes. Intermediate nodes in the tree have a parent node and a descendant node, and can also have one or more peer nodes at an equal depth from the root node. Each node represents a characteristic of the host, and the nodes are arranged so that each child node represents a more specific identification of the characteristic than the node's parent. In addition, each node also identifies a set of vulnerabilities that a host having the characteristic represented by the node might possess. To determine potential vulnerabilities of a host, the control module 320 traverses the nodes of the vulnerability tree and identifies the lowest level (i.e., farthest descendant from the root) node corresponding to the characteristics of the host. The potential vulnerabilities of the host are the sum of the vulnerabilities of the lowest node and its parent nodes. The rules database module 365 may hold multiple vulnerability trees applicable to the hosts 191 on the network 115. In one embodiment, there is a vulnerability tree for potential applications running on a host and another vulnerability tree for potential operating systems running on the host. Other embodiments can have other types of vulnerability trees and/or other arrangements of vulnerability data.

The illustrated vulnerability tree 400 stores vulnerabilities associated with particular applications executing on a host 191. Each node is associated with an application, application version and/or patch version and has an associated list of zero or more vulnerabilities that might be possessed by the host 191 executing the application. A child node (e.g., node 424 is child node of node 414) represents a more specific identification of the application, such as a specific type, version and/or patch level and has a list of zero or more vulnerabilities unique to that node. As such, the total list of vulnerabilities that a given application may possess is determined by identifying the applicable lowest-level child node and summing that node's vulnerability list with the vulnerability lists of any parent nodes.

The exemplary vulnerability tree of FIG. 4 has four levels and is used to identify vulnerabilities associated with the application running on an open port of the host 191. The top level is an application type level 410 and has separate nodes for FTP, HTTP, and Telnet. The next level is an application level 420. In this example, the vulnerability tree is expanded for the HTTP application type 414. Thus, the applications level has two nodes corresponding to specific HTTP applications, namely Apache 422 and IIS (Internet Information Server) 424. The next level is a version level 430, which in this example includes nodes for versions 1.0 432, 2.0 434 and 3.0 436 of IIS. The next level is the patch level 440 and it includes nodes for the possible patch levels of the application versions. In this example, the vulnerability tree includes Service Pack 1 and Service Pack 2 patch level nodes 442, 444.

Figure 5:
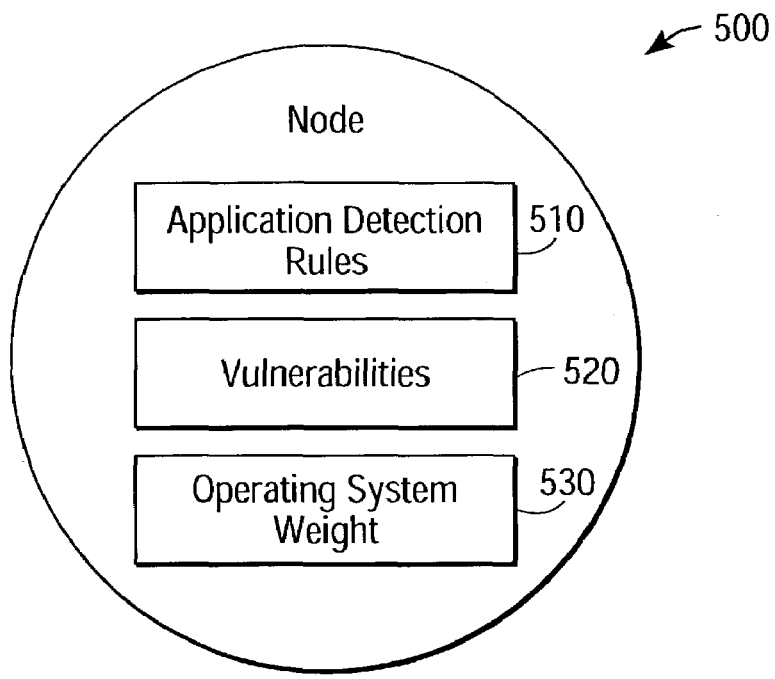
FIG. 5 is a block diagram illustrating a node 500 in the vulnerability tree 400 according to an embodiment of the present invention.

FIG. 5 is a block diagram illustrating an example of a node 500 in a vulnerability tree 400. The node 500 of FIG. 5 is for an application vulnerability tree. Nodes in other types of vulnerability trees can differ from the one described herein. The application node 500 includes node application detection rules 510, zero or more node vulnerabilities 520, and an optional node operating system weight 530.

The node application detection rules 510 are rules used by the control module 320 to determine whether the host 191 has the characteristics represented by the node. These rules 510 contain deterministic logic such as Boolean conditions that are applied against the characteristics of the host 191 as measured by the high-355 and/or low-level 345 sensors. A rule is satisfied if the host has the characteristic described by the rule. In one embodiment, each application detection rule has a weight. The weight represents the probability that a host satisfying the rule has the characteristic represented by the node. For example, a highly-dispositive rule has a large weight while a less dispositive rule has a smaller weight. The weight for a node is the sum of the weights of its satisfied rules.

In one embodiment, the control module 320 traverses the application vulnerability tree by evaluating the application detection rules of the one or more child nodes from its present position in the tree and thereby generating a weight for each child node. The control module 320 traverses to the child node having the highest weight. In one embodiment, if none of the weights of the child nodes exceed a threshold, the control module 320 implements a searching procedure to determine if it has incorrectly traversed the tree.

This technique allows the control module 320 to detect applications executing on non-standard ports. For example, if an email application is executing on the port normally used for web servers, the control module might initially traverse down the portion of the application tree 400 for identifying characteristics of web servers. At some point, many of the characteristics described by the nodes would not apply to the host 191 due to the application being an email application instead of a web server, causing the weights of the child nodes to fall below the threshold. At this point, the control module 320 searches other portions of the application tree (and/or evaluates nodes of other vulnerability trees) in order to identify nodes that better represent the host's 191 characteristics.

The node vulnerabilities 520, if there are any associated with a node, are vulnerabilities that a host 191 having the characteristics represented by the node might possess. In one embodiment, the vulnerabilities 520 of a node are the vulnerabilities unique to the specific characteristic represented by the node. In this embodiment, therefore, the total vulnerabilities of the host (for a given tree) is the sum of the lowest child node and its parent nodes. In other embodiments, the node vulnerabilities are stored in different representations.

The operating system weight 530, if any, indicates the probability that a host 191 having the node characteristic is also running a certain operating system. In one embodiment, the operating system weight 520 indicates a particular node in the operating system vulnerability tree and a weight to add to that node. Nodes representing characteristics that are compatible with a single operating system (e.g., IIS is only compatible with Windows) have a relatively high operating system weight 530 because presence of the characteristic is highly correlative to presence of the operating system and vice-versa.

The vulnerability tree for operating systems is similar to the application vulnerability tree 400 described above. For example, a top level of the tree can represent an operating system family (e.g., Unix, Windows, and MacOS) and descending levels can represent specific operating systems in each family (e.g., specific to Widows is XP, NT, 2000), operating system versions (e.g., specific to NT is 3.5 and 4.0), and patch levels (specific to 3.5 is Service Pack 1 and Service Pack 2).

Figure 6:
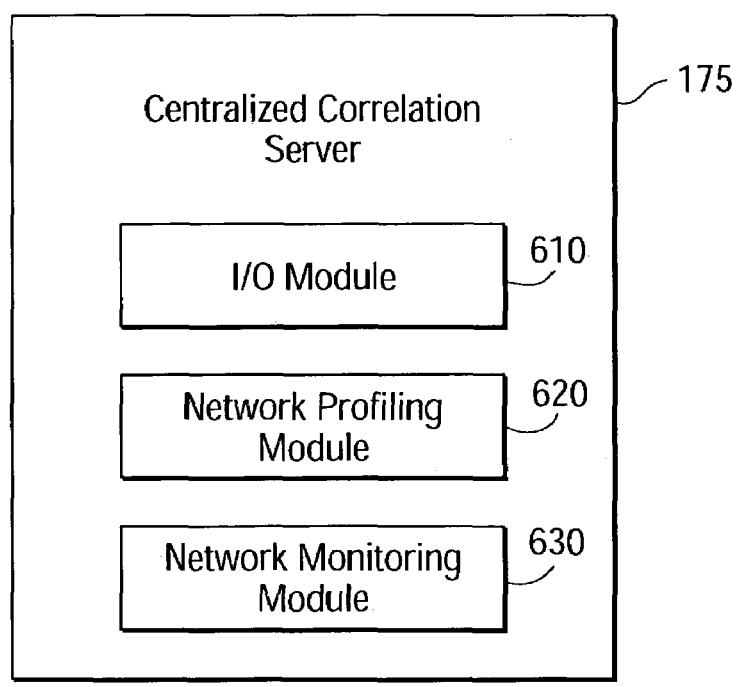
FIG. 6 is a block diagram illustrating a centralized correlation server 175 according to an embodiment of the present invention.

FIG. 6 is a block diagram illustrating a centralized correlation server 175 according to an embodiment of the present invention. The centralized correlation server 175 comprises an I/O module 610, a network profiling module 620, and a monitoring module 530.

The I/O module 610 allows the centralized correlation server 175 to communicate with other devices on the network such as the device profilers 165 and the traffic monitors 185. In one embodiment the I/O module 610 provides I/O functionality to a user through a user interface. The user may, for example, manipulate the configuration information or receive messages from the centralized correlation server 175 regarding the operation and status of the system 100. Depending on the embodiment, the I/O module 610 may be a network interface card or other hardware, a software module, or a combination of both.

The network profiling module 620 stores the information used by device profilers 165 to identify vulnerabilities and also stores the vulnerabilities of the system 100 detected by the device profilers 165. In one embodiment, the network profiling module 620 generates an abstract view of the configuration of the enterprise network 115 from the information collected from the individual device profilers 191. Advantageously, the network profiling module 620 leverages from individual data points to provide improved network security services.

The network monitoring module 630 stores the information used by the traffic monitors 185 to monitor network traffic for attacks on identified vulnerabilities and also stores attack signatures correlating to vulnerabilities of the system 100. In one embodiment, the networking monitoring module 530 sends each traffic monitor 185 the attack signatures for all of the vulnerabilities in the system 100. In one embodiment, the network monitoring module 630 sends traffic monitors 185 attack signatures for only vulnerabilities of hosts 191 accessible to the traffic monitored by the traffic monitor 185.

Figure 7:
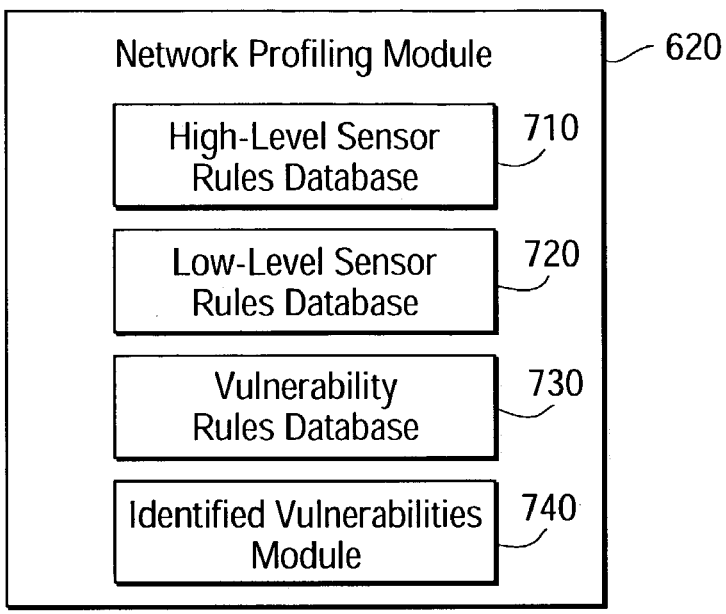
FIG. 7 is a block diagram illustrating a more detailed view of the network profiling module 620 of FIG. 6.

FIG. 7 is a block diagram illustrating a more detailed view of the network profiling module 620 of FIG. 6. The network profiling module 620 comprises a low-level sensor rules database 610, a high-level sensor rules database 620, a vulnerability rules database 730, and an identified vulnerabilities module 740. In some embodiments, some or all of these databases can be combined. Advantageously, the rules are stored in a central location for updates, which can then be distributed downstream to the device profilers 165.

The high-level sensor rules database 710 stores rules used by the high-level sensors 355 of device profilers 365 to identify applications executing on hosts 191 and other characteristics of the hosts 191. The high-level sensor rules database 710 holds rules for sending data to the host 191 that will identify characteristics of the host 191 when analyzed at layers 5–7. For example, a telnet application may respond directly to an inquiry for self-identification.

The low-level sensor rules database 720 stores rules used by the low-level sensors 345 of the device profilers 165 for identifying operating systems or other characteristics of the hosts 191. These rules include information for generating anomalous data packets and analyzing the responses to the packets received from the hosts 191 in order to identify operating systems and applications on the host 191.

The vulnerability rules database 730 stores rules used by the control module 320 to identify and verify potential vulnerabilities at the device profilers 165. These rules include the vulnerability trees and rules for using the sensors to traverse the trees, as well as rules for using the sensors to verify the presence of the specific vulnerabilities identified by the trees. The identified vulnerabilities module 740 stores data describing the vulnerabilities of hosts 191 on the network identified by the device profilers 165.

Figure 8:
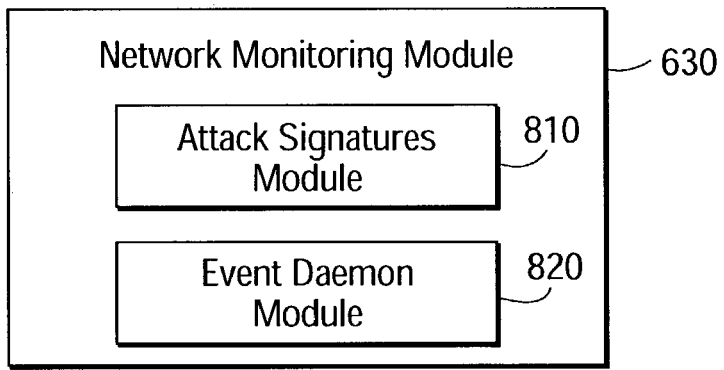
FIG. 8 is a block diagram illustrating a more detailed view of the network monitoring module of FIG. 6.

FIG. 8 is a block diagram illustrating a more detailed view of the network monitoring module 630 of FIG. 6. The network monitoring module 630 comprises an attack signatures module 810 and an event daemon module 820.

The attack signatures module 810 stores attack signatures for identifying network traffic indicative of attacks exploiting vulnerabilities of hosts 191 on the network. The attack signatures may be logical rules tested against network traffic. The attack signatures module 810 is configured to generate a subset of attack signatures corresponding to vulnerabilities identified by the device profilers 165 and send the attack signatures to the traffic monitors 185 in the system 100. In one embodiment, the attack signatures are sent to traffic monitors 185 based on their locations in the system 100.

The event daemon module 820 performs a set of actions to block a host's exposure to its vulnerabilities. In one embodiment the event daemon module 820 responds to a notification of vulnerabilities from the device profiler 165. In another embodiment, the event daemon module 820 responds to a notification of a real-time attack from the traffic monitor 185. The blocking actions may include configuring a firewall to halt communication between the enterprise network 115 and the WAN 130, closing open ports on the host 191, and/or preventing the operating systems and/or applications from executing programs.

The event daemon module 820 may also send an alert to a network administrator or log the attack. In another embodiment, the event daemon module 820 logs attacks. New information may be compared to previous information in identifying multi-faceted attacks to the enterprise network 115. In still another embodiment, the event daemon 720 sends a message to the user indicating the type and location of an attack.

Figure 9:
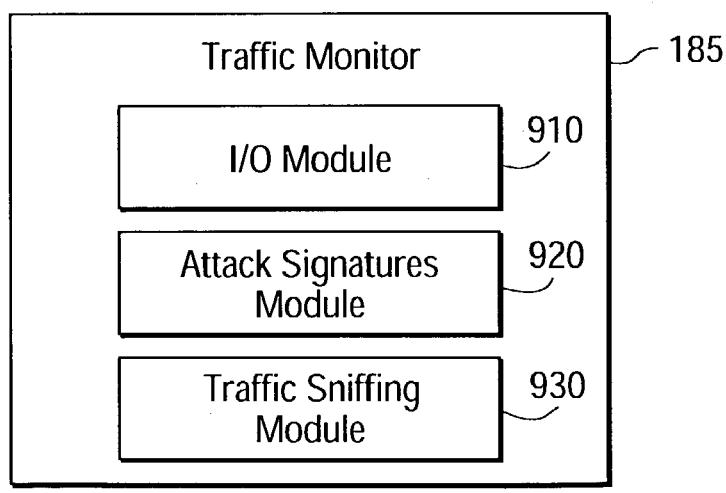
FIG. 9 is a flow chart illustrating a traffic monitor 185 according to an embodiment of the present invention.

FIG. 9 is a block diagram illustrating an embodiment of the traffic monitor 185 according to the present invention. The traffic monitor comprises an I/O module 910, an attack signatures module 920, a rule parsing module 830, and a traffic sniffing module 840.

The I/O module 910 allows the traffic monitor 185 to communicate with other devices on the network such as the centralized correlation server 175. In implementation, the I/O module 910 may be a network interface card or other hardware, a software module, or a combination of both.

The attack signatures module 920 stores attack signatures received from the centralized correlation server 175. In one embodiment, the attack signatures module 810 generates subsets of attack signatures valid for each potential destination of traffic monitored by the traffic monitor 185. For example, one subset contains attack signatures valid for a particular IP address and port number. The subset contains the attack signatures of exploits attacking the vulnerabilities known to be present at that specific IP address and port.

The traffic sniffing module 840 monitors network traffic to detect traffic corresponding to attack signatures in the attack signatures module 920. The traffic sniffing module 840 analyzes network traffic to identify patterns matching the attack signatures. Preferably, the traffic sniffing module 840 uses the subsets of attack signatures to monitor for only exploits of vulnerabilities present at the destination of the traffic. Thus, the traffic sniffing module 840 will ignore an attack signature directed to a destination (e.g., IP address and/or port) that is not vulnerable to the exploit. Additionally, the traffic sniffing module 930 is configured to send a notification message to the centralized correlation server 175 in response to detecting an attack signature.

Figure 10:
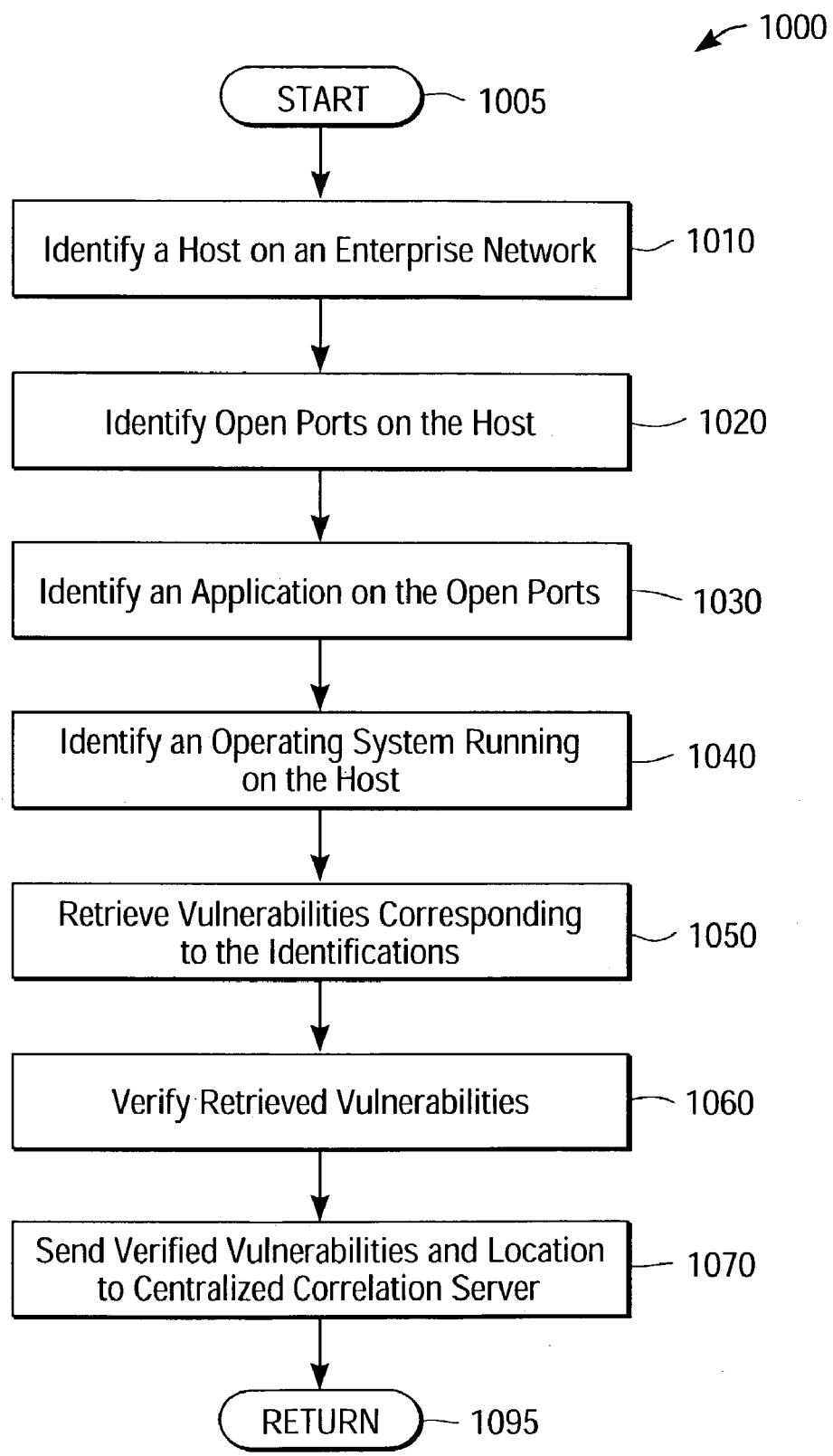
FIG. 10 is a flow chart illustrating a method of profiling a host 191 to detect potential vulnerabilities as performed by the device profiler 165 according to an embodiment of the present invention.

FIG. 10 is a flow chart illustrating a method of profiling a host 191 to detect potential vulnerabilities as performed by the device profiler 165 according to an embodiment of the present invention. The control module 320 identifies 1010 hosts on the enterprise network 115 by periodically testing for responses over a range of addresses available in the network, for example, by sending ping requests to each address. In one embodiment, the centralized correlation server 175 notifies device profilers 165 of known hosts on the enterprise network 115. The control module 320 identifies 1020 open ports on the host 191 by periodically port scanning the host 191, for example, by sending TCP connection requests to each port.

The control module 320 identifies 1030 an application running on an open port by using the high and/or low-level 355, 345 sensors to traverse the nodes of the application vulnerability tree. As part of this process, the control module 320 uses the operating system weights of traversed nodes to identify a starting point in the operating system tree (e.g., the node having the highest weight value). This starting point is typically one to two levels below the root node of the tree. The control module 320 uses the high and/or low-level 355, 345 sensors to traverse the operating system tree from the starting point to identify 1040 an operating system running on the host 191. The control module 320 identifies 1050 the total set of vulnerabilities for the host 191 from the vulnerability trees. Next, the control module 320 uses the sensors 345, 355 to verify 1060 the existence of the vulnerabilities on the host 191.

The method 1000 is iterative 1095, so the device profiler 165 is scanning constantly or at intervals according to the above process. In another embodiment, the method 1000 is repeated in response to a change in a host 191, the network configuration, or otherwise.

Figure 11:
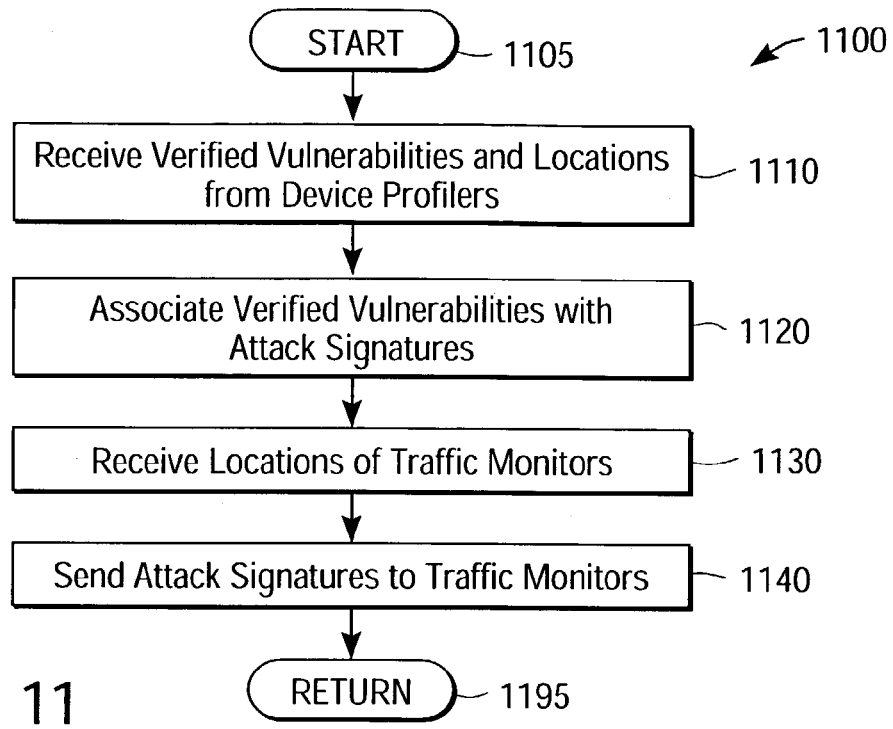
FIG. 11 is a flow chart illustrating a method of providing network security to a distributed network as performed by the centralized correlation server 175 according to an embodiment of the present invention.

FIG. 11 is a flow chart illustrating a method of providing distributed security in a network as performed by the centralized correlation server 175 according to an embodiment of the present invention. The centralized correlation server 175 receives 1110 verified vulnerabilities and locations of device profilers 165 in the system 100 stores them in the identified vulnerabilities module 740.

In preparing information for distribution, the attack signatures module 810 associates 1120 verified vulnerabilities with attack signatures used to monitor for attacks on the vulnerabilities. The centralized correlation server 175 receives 1130 locations of traffic monitors 185 on the system 100. Next, the centralized correlation server 175 sends 1140 the attack signatures for the verified vulnerabilities to the traffic monitors 185 based on the traffic monitors' 185 locations.

The centralized correlation server 175 repeats the discussed steps 1110, 1120, 1130, 1140 to update attack signatures at relevant traffic monitors.

Figure 12:
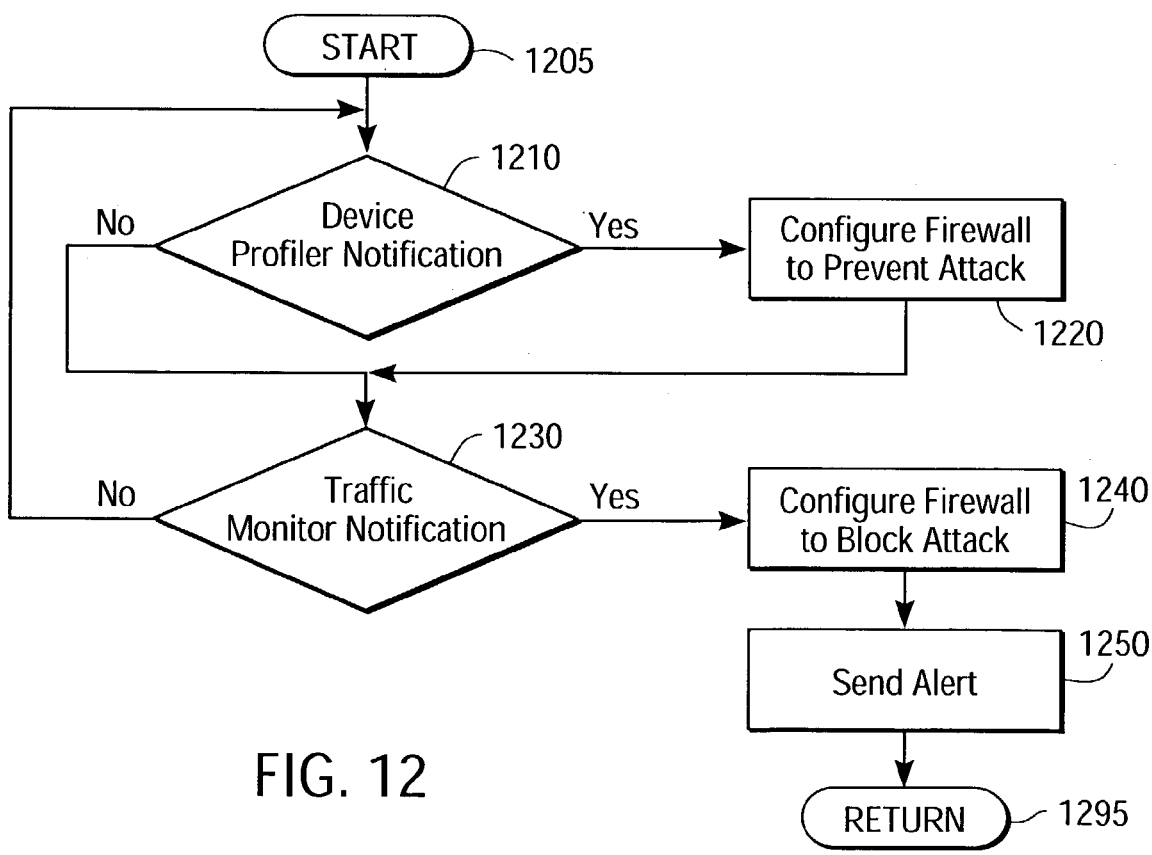
FIG. 12 is a flow chart illustrating a method of performing a set of actions to block exposure to a vulnerability by the event daemon module 820.

FIG. 12 is a flow chart illustrating a method of performing a set of actions to block exposure to a vulnerability by the event daemon module 820. In response to receiving 1210 a notification related to vulnerabilities sent by the device profiler 165, the event daemon module 820 performs a set of actions such as configuring 1220 the firewall 150 to prevent the attack. The notification may be sent directly by the device profiler 165, or indirectly such as from the identified vulnerability module 740. In one embodiment, the notification is sent to block vulnerabilities that have a high probability of being attacked, or that have a high consequence as a result of being attacked.

In response to receiving 1230 notification of malicious activity from a traffic monitor 185, the centralized correlation server 175 performs a set of actions such as configuring the firewall 150 in real-time to block the attack. The event daemon module 820 may also send 1250 an alert to a network administrator or log the attack.

Figure 13:
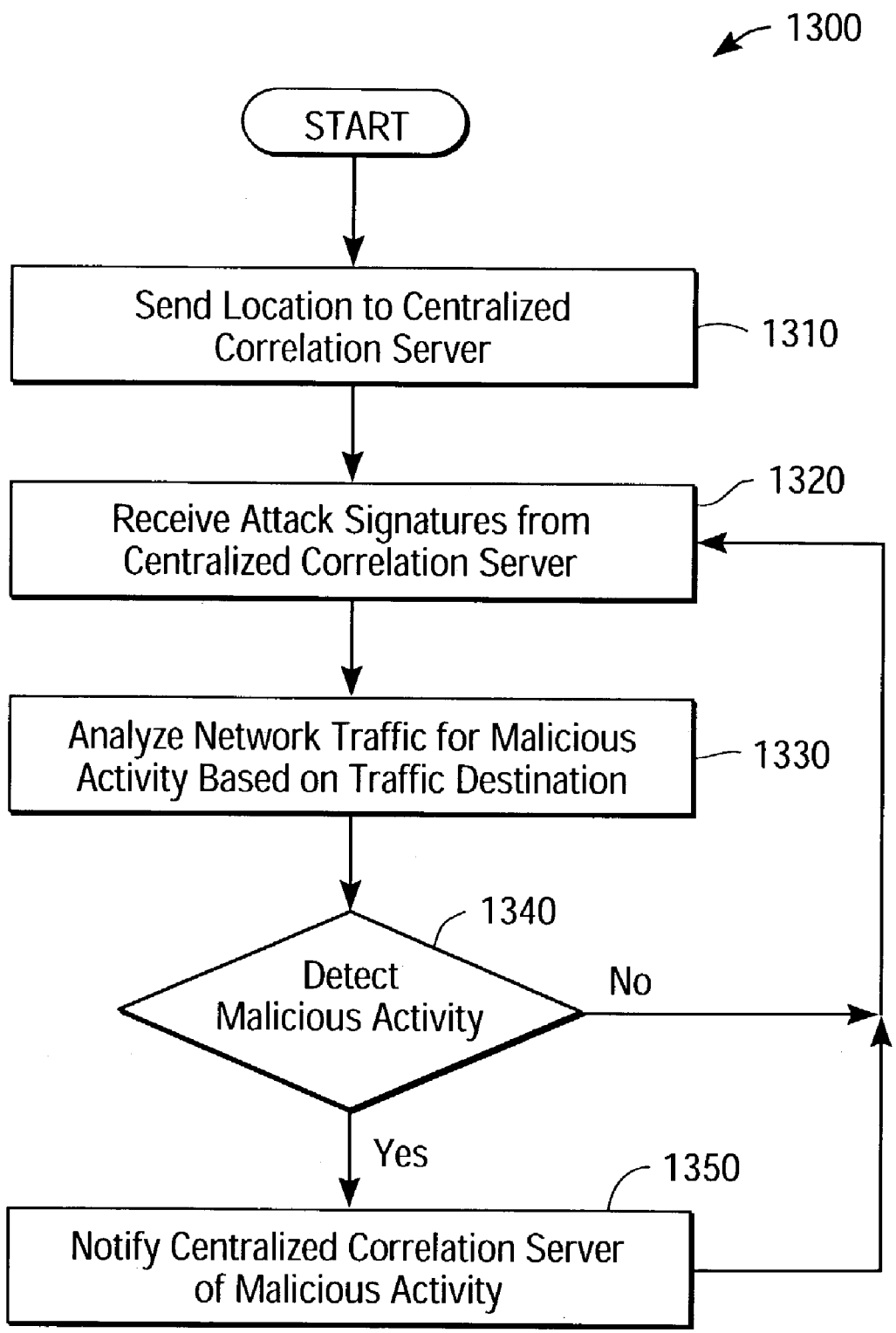
FIG. 13 is a flow chart illustrating a method of monitoring a distributed network as performed by the traffic monitor 185 according to an embodiment of the present invention.

FIG. 13 is a flow chart illustrating a method of monitoring a distributed network as performed by the traffic monitor 185 according to an embodiment of the present invention. The traffic monitor 185 sends 1310 a network location to the centralized correlation server 175. The centralized correlation server 175 returns 1320 attack signatures preferably derived at least in part from device profiler's 165 location or likelihood to examine network traffic containing a specific attack signature.

The traffic monitor 185 analyzes 1330 network traffic for attack signatures. In one embodiment, the traffic monitor 185 determines the destination (e.g., IP address and/or port number) of the traffic, determines the attack signatures associated with that destination, and indicates an attack if the network traffic matches an associated attack signature. In response to detecting malicious activity 1350, the traffic monitor 185 notifies 1240 the event daemon module 820 in the centralized correlation server 175. Otherwise, the traffic monitor 185 constantly examines network traffic.

In summary, the system 100 is configured pre-incident to an attack on vulnerabilities present on the hosts 191. Accordingly, the traffic monitors 185 and the firewall 150 more effectively and efficiently protect the hosts 191 from malicious activity by leveraging off of information collected from device profilers 165 through the centralized correlation server 175. Additionally, the system configuration is constantly updated to reflect changes inside the network and additional threats from the outside.

The above description is included to illustrate the operation of the preferred embodiments and is not meant to limit the scope of the invention. The scope of the invention is to be limited only by the following claims. From the above discussion, many variations will be apparent to one of ordinary skill in the art that would yet be encompassed by the spirit and scope of the invention.

We claim:

1. A distributed computer network security system for detecting an attack on a host on a network having a plurality of hosts, the system comprising:
    a device profiler communicatively coupled with the network, the device profiler for identifying characteristics of a host from the plurality of hosts on the network and determining vulnerabilities of the host based on the characteristics according to a tree-structured vulnerability table; and
    a traffic monitor, communicatively coupled with the network and the device profiler, and cooperative with the device profiler, for monitoring the network for traffic indicative of an attack on the host, from the plurality of hosts on the network, exploiting one of the determined vulnerabilities of the host, wherein a determined vulnerability pertains to a specific location and wherein the traffic monitor monitors for exploits of the determined vulnerability directed to the location and ignores exploits of the determined vulnerability directed to locations to which the determined vulnerability does not pertain.

2. The system of claim 1, wherein the device profiler comprises:
    an identification subsystem for sending data packets to the host and determining the characteristics of the host based on the host's response to the data packets.

3. The system of claim 2, wherein the identification subsystem comprises:
    an high-level sensor for sending data packets to the host and analyzing responses of the host with respect to at least one of layer 5, layer 6 and layer 7 of the Open Systems Interconnection model to determine characteristics of the host.

4. The system of claim 3, wherein the determined characteristics comprise an application executing on the host.

5. The system of claim 2, further comprising:
    a control module for generating a list of vulnerabilities of the host based on the characteristics determined by the identification subsystem.

6. The system of claim 5, wherein the control module is adapted to use the characteristics determined by the identification subsystem to traverse the tree-structured vulnerability table, the vulnerability table having nodes associated with the characteristics of the host, each node having an associated set of vulnerabilities.

7. The system of claim 6, wherein a node representing an application further comprises an operating system weight indicative of an operating system executing on the host.

8. The system of claim 6, wherein the control module is adapted to determine a set of vulnerabilities of the host by summing the vulnerabilities associated with traversed nodes.

9. A distributed computer network security system for detecting an attack on a host on a network having a plurality of hosts, the system comprising:
    a device profiler communicatively coupled with the network, the device profiler for identifying characteristics of a host from the plurality of hosts on the network and determining vulnerabilities of the host based on the characteristics according to a tree-structured vulnerability table;
    a traffic monitor, communicatively coupled with the network and the device profiler, and cooperative with the device profiler, for monitoring the network for traffic indicative of an attack on the host, from the plurality of hosts on the network, exploiting one of the determined vulnerabilities of the host; and
    a centralized correlation server, communicatively coupled with the network at a centrally accessible location, the device profiler and the traffic monitor, the centralized correlation server for receiving the determined vulnerabilities from the device profiler, identifying signatures of network traffic indicating attacks exploiting the determined vulnerabilities, and sending the signatures to the traffic monitor.

10. The system of claim 9, wherein the network has a plurality of locations and each location provides a different perspective of the host, and wherein there are a plurality of device profilers coupled to the network at a network location, each device profiler determining vulnerabilities of the host from the device profiler's perspective at the network location.

11. The system of claim 10, wherein the centralized correlation server further comprises a vulnerability verification rules database for storing rules to non-intrusively verify the identified vulnerabilities.

12. The system of claim 10, wherein the centralized correlation server further comprises an identified vulnerabilities module for storing a plurality of determined vulnerabilities received from the plurality of device profilers, identifying signatures of network traffic indicating attacks exploiting determined vulnerabilities, and sending the attack signatures to the traffic monitor.

13. The system of claim 12, wherein one or more traffic monitors are at selected locations on the network, and wherein the centralized correlation server sends the traffic monitor attack signatures for only vulnerabilities exploitable from the perspective of the traffic monitor.

14. The system of claim 9, wherein the centralized correlation server comprises:

an event module for, in response to receiving a notification related to one of the determined vulnerabilities, performing a set of actions to block exposure to the vulnerability.

15. The system of claim 14, further comprising:

a firewall adapted to selectively restrict network traffic to the host, wherein the event module is adapted to configure the firewall to restrict traffic that exploits the determined vulnerability.

16. A distributed computer network security system for detecting an attack on a host on a network having a plurality of hosts, the system comprising:

a device profiler communicatively coupled with the network, the device profiler for identifying characteristics of a host from the plurality of hosts on the network and determining vulnerabilities of the host based on the characteristics according to a tree-structured vulnerability table, the device profiler including a low-level sensor for sending anomalous data packets to the host and determining the characteristics based on the host's response to the anomalous data packets; and a traffic monitor, communicatively coupled with the network and the device profiler, and cooperative with the device profiler, for monitoring the network for traffic indicative of an attack on the host, from the plurality of hosts on the network, exploiting one of the determined vulnerabilities of the host.

17. The system of claim 16, wherein the low-level sensor is adapted to determine the characteristics of the host by analyzing responses of the host with respect to at least one of layer 3 and layer 4 of the Open Systems Interconnection model.

18. The system of claim 16, wherein the determined characteristics comprise an operating system version and patch level of the host.

* * * * *

UNITED STATES PATENT AND TRADEMARK OFFICE
CERTIFICATE OF CORRECTION

PATENT NO. : 7,181,769 B1 Page 1 of 1
APPLICATION NO. : 10/456837
DATED : February 20, 2007
INVENTOR(S) : Timothy D. Keanini et al.

It is certified that error appears in the above-identified patent and that said Letters Patent is hereby corrected as shown below:

On the Title page Item (57) Abstract: line 13 of the Abstract, please change "attach" to --attack--.

Signed and Sealed this

Eighth Day of May, 2007

JON W. DUDAS
*Director of the United States Patent and Trademark Office*